United States Patent
Tripp et al.

(10) Patent No.: US 7,133,870 B1
(45) Date of Patent: Nov. 7, 2006

(54) INDEX CARDS ON NETWORK HOSTS FOR SEARCHING, RATING, AND RANKING

(75) Inventors: Gary W. Tripp, Bainbridge Island, WA (US); Michael D. Meadway, Snohomish, WA (US); Claude E. Duguay, Seattle, WA (US)

(73) Assignee: AI Acquisitions, Inc., Kirkland, WA (US)

( * ) Notice: Subject to any disclaimer, the term of this patent is extended or adjusted under 35 U.S.C. 154(b) by 854 days.

(21) Appl. No.: 09/718,531

(22) Filed: Nov. 21, 2000

Related U.S. Application Data

(63) Continuation of application No. 09/419,405, filed on Oct. 14, 1999, now Pat. No. 6,516,337.

(51) Int. Cl.
*G06F 17/00* (2006.01)
*G06F 7/00* (2006.01)

(52) U.S. Cl. ............................. 707/10; 707/5; 707/100
(58) Field of Classification Search ............... 707/10, 707/100, 102, 1, 6, 7, 103 R, 5
See application file for complete search history.

(56) References Cited

U.S. PATENT DOCUMENTS

| | | | | |
|---|---|---|---|---|
| 5,694,593 A * | 12/1997 | Baclawski | ...................... | 707/5 |
| 5,748,954 A * | 5/1998 | Mauldin | ...................... | 707/10 |
| 5,864,863 A * | 1/1999 | Burrows | ................. | 707/103 R |
| 5,973,683 A * | 10/1999 | Cragun et al. | ............... | 715/719 |
| 5,983,216 A * | 11/1999 | Kirsch et al. | ................... | 707/2 |
| 6,029,141 A * | 2/2000 | Bezos et al. | ................... | 705/27 |
| 6,067,552 A * | 5/2000 | Yu | ........................... | 715/501.1 |
| 6,078,916 A * | 6/2000 | Culliss | ........................... | 707/5 |
| 6,154,738 A * | 11/2000 | Call | ............................. | 707/4 |
| 6,256,622 B1 * | 7/2001 | Howard et al. | ................ | 707/3 |
| 6,295,559 B1 * | 9/2001 | Emens et al. | ............... | 709/225 |
| 6,336,117 B1 * | 1/2002 | Massarani | .................... | 707/100 |
| 6,385,602 B1 * | 5/2002 | Tso et al. | ...................... | 707/3 |
| 6,434,556 B1 * | 8/2002 | Levin et al. | ................... | 707/5 |
| 6,785,671 B1 * | 8/2004 | Bailey et al. | .................. | 707/3 |

OTHER PUBLICATIONS

The Information Specialist's Guide to Searching and Researching on the Internet and the World Wide Web, Karen Hartman, Ernest Ackerman, Oct. 1998, Fitzroy Dearborn Publishers, Inc.*

* cited by examiner

*Primary Examiner*—John R. Cottingham
*Assistant Examiner*—Kuen S. Lu
(74) *Attorney, Agent, or Firm*—Black Lowe & Graham PLLC (57) ABSTRACT

Instead of using a central site including spidering software to recursively search all linked web pages and generate a search index of the Internet, index cards files are created and stored on each web site to provide meta data in the form of conceptual or non-keyword information about the site, such as demographics and categorization information. The meta data is periodically collected and aggregated on a central server. A central catalog of object references is compiled on the central site from the meta data reported from each web site. The information from the index cards is utilized in constructing the central catalog so that more accurate search results may be generated for search queries applied to the catalog, so that the search results may be ranked in meaningful ways, and so that web sites may be more accurately rated.

34 Claims, 5 Drawing Sheets

INDEX CARDS ON NETWORK HOSTS FOR SEARCHING, RATING, AND RANKING

PRIORITY CLAIM

The present invention is a continuation of U.S. patent application Ser. No. 09/419,405 filed Oct. 14, 1999, now U.S. Pat. No. 6,516,337, and claims the benefit of PCT Application serial no. US00/28653 filed Oct. 13, 2000. The contents of the applications above are hereby incorporated by reference.

TECHNICAL FIELD

The present invention relates to computer network search engines and more particularly to a method and system for allowing the managers of host computers and of web sites on those hosts to enter data into a data structure which can be used by a central search engine for searching, ranking search results, and rating web sites.

BACKGROUND OF THE INVENTION

In the last several years, the Internet has experienced exponential growth in the number of web sites and corresponding web pages contained on the Internet. Countless individuals and corporations have established web sites to market products, promote their firms, provide information on a specific topic, or merely provide access to the family's latest photographs for friends and relatives. As a result of the rapid growth in web sites on the Internet, it has become increasingly difficult to locate pertinent information.

Search engines, such as Inktomi, Excite, Lycos, Infoseek, or FAST, are typically utilized to locate information on the Internet. Upon inquiry from a user, the search engine software searches the millions of records contained in a central index. The search engine software finds matches to the search query and may rank them in terms of relevance according to predefined ranking algorithms. While most search engines accept submissions of sites for indexing, even upon such a submission, the site may not be indexed in a timely manner, if at all.

An inherent shortcoming of the method of indexing utilized in the conventional search engine is that only documents stored with a mark-up language such as SGML, HTML or XML is utilized in generating the central index. Due to the format of a mark-up language web page, certain types of information may not be placed in the mark-up language tags. For example, conceptual information such as the intended audience's demographics and geographic information may not be placed in an assigned tag in the document. Such information would be extremely helpful in generating a more useful index. For example, a person might want to search in a specific geographical area, or within a certain industry. Assume a person is searching for a red barn manufacturer in a specific geographic area. Because mark-up language pages have no standard tags for identifying industry type or geographical area, the spider on the server in the conventional search engine does not have such information to utilize in generating the central index. As a result, the conventional search engine would typically list not only manufacturers but would also list the location of picturesque red barns in New England that are of no interest to the searcher.

Some Internet search engines, such as Infoseek, have proposed a distributed search engine approach to assist their spidering programs in finding and indexing new web pages. Infoseek has proposed that each web site on the Internet create a local file named "robots1.txt" containing a list of all files on the web site that have been modified within the last twenty-four hours. Files that have not been modified will not be indexed, saving bandwidth on the Internet otherwise consumed by the spidering program and thus increasing the efficiency of the spidering program.

There is a need for a method and system of indexing or cataloging remotely stored data that allows conceptual information and other human generated information about web sites to be utilized in generating the index to allow sites to be found in a search, to make search results more meaningful, and to allow sites to be more accurately rated.

Full-text search and indexing systems such as web search engines typically have two distinct means of organizing the presentation of documents. The first means is usually a categorization system (hierarchical or otherwise) which presents the documents in groups or "clusters" related by topic, content or origin. The second is dynamically generated as a result of a search process of some sort such as a matching keyword search. Normally, this second means is presented as a linear list in which matching documents are sorted either by alphabetical title, date of change or a ranking value based on a calculation whose input may come in part from the document content. For example, in searching for the work "car" in a set of documents, the resulting list of matching documents might be sorted by the number of times the word occurred in each document.

SUMMARY OF THE INVENTION

According to one aspect of the present invention, one or more brochure files or "index cards" are created and stored within each web site on a network to provide conceptual or non-keyword data about the site, such as demographics and categorization information, related to one or more parts of the web site. This conceptual information is then utilized in constructing the central catalog so that more accurate search results may be generated in response to search queries applied to the catalog. This categorization information is transmitted by an agent program on the host to the central index.

Important uses for the categorization information include the language of the web site, any geographic location to which the web site is particularly relevant, demographic information about the audience of people that will likely be interested in the site or that the owner of the site wishes to target, or the subject matter of the site so that it can be found by people who are searching for certain subject matter.

Like other information about a web site, information contained within the index cards can be used in ranking algorithms on a search engine to rank the kreferences found according to a set of ranking rules. The ranking process can include both data derived from the contents of objects or from meta data associated with objects, or from the index cards. In addition to using the categorization information to filter search results to produce more meaningful search results, the categories can be structured as hierarchies with sub-categories in each category. Then, when a user designates a category to find web sites that match that category designation, the system can also provide to the user references to web sites associated with sub-categories within that category.

The preferred method of transferring the index card information to the central site is with an agent program located on each web site host. To further improve the ranking results, the agent program can also process objects on the web site to parse their contents and extract data from the objects which can be used by the agent program in a ranking algorithm which follows a set of ranking rules, producing assigned rankings for objects on the web site. The agent can then transmit via signed rankings to the central cataloging site for further processing.

The index cards can also be useful for improving the rating of web sites such as rating for adult content or other content that selected groups might consider offensive. The web site owner can apply a rating to the site which is stored in the index card. Also, the administrator of the host computer system can apply a rating to the web site. These ratings can be compared to ratings which are automatically generated by parsing words on the web site to assess their probable accuracy. The agent program can assist in this process by parsing the words in the web site according to rating values and then forwarding the rating values to the central cataloging computer.

The index cards can also be used by web site owners and host system administrators to regulate the exposure of objects on the host to other computer systems on the network. The index card can be used to list non-html objects and provide sufficient information about the objects that they can be remotely accessed across the network. Remote computer systems can read the index card directly to obtain its information or, in the preferred embodiment, the index card information is periodically transmitted to a central site where it is organized for searching by remote computer systems.

For purposes of the following discussion, each object consists of both contents (meaning only the essential data itself and not a header) and associated "meta data". The meta data includes all information about the contents of an object but not the contents itself. The meta data includes any information that has been extracted from the contents and is associated with the object, any header information within the object, and any file system information stored outside of the object such as directory entries. The term "object" is used only to refer to anything stored on a site of interest to a person who might access the site from the network and its associated meta data. To avoid confusion, the term "object" is not used more broadly.

DETAILED DESCRIPTION OF THE INVENTION

Figure 1:
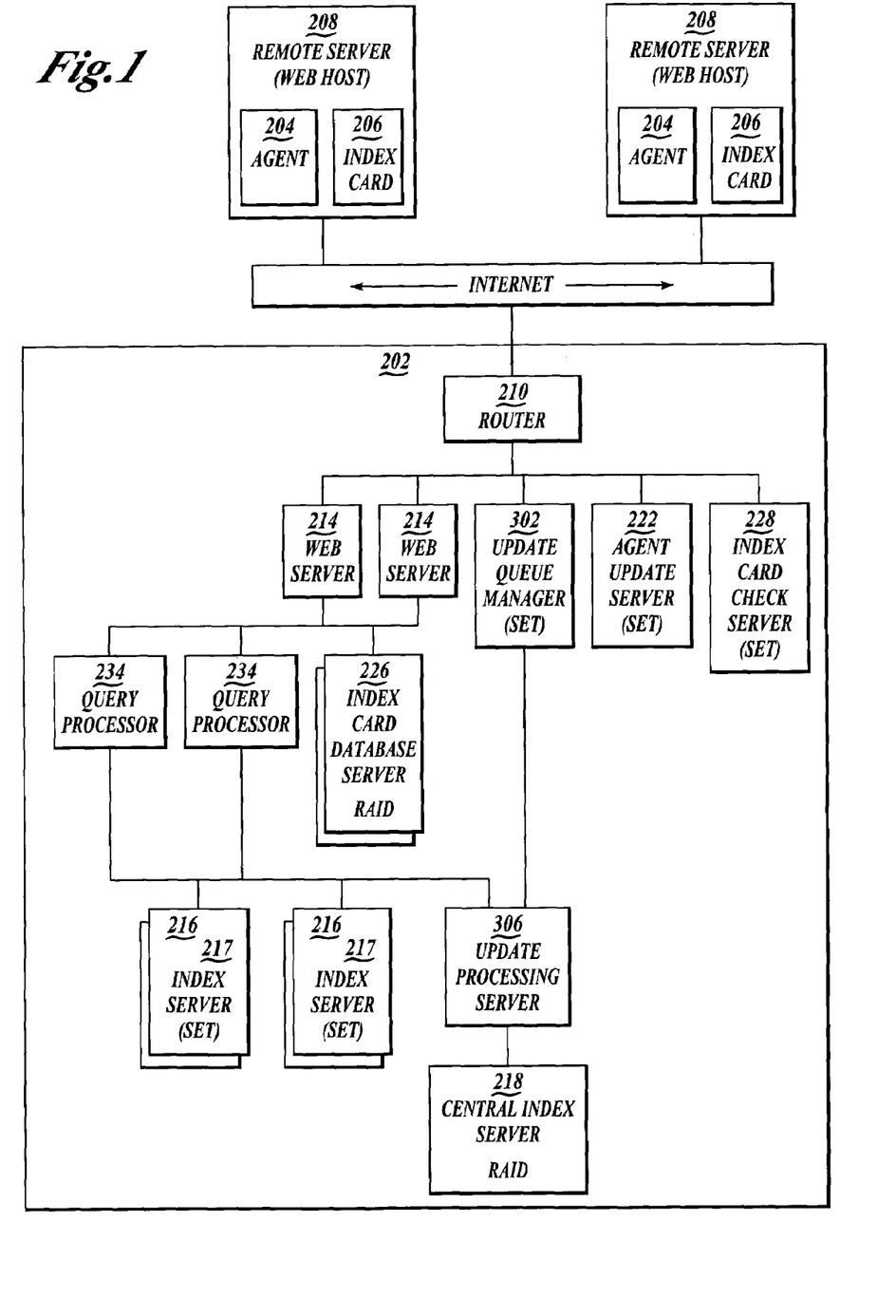
FIG. 1 is is block diagram showing the architecture of a search engine for actively indexing the world wide web according to one embodiment of the present invention.

FIG. 1 is a block diagram of an indexing system for indexing the Internet using index cards according to one embodiment of the present invention. The system includes a central server 202 that stores a central index and processes search queries received over the Internet. The system also includes brochure files or "index card" files 206 residing on respective remote servers 208, each index card file containing non-HTML or conceptual information about the web site for use in generating the central index on the server 202, as will also be explained in more detail below. For the sake of brevity, only two remote servers 208 and the corresponding agent 204 and index card 206 are shown in FIG. 1. The system, however, includes numerous such remote servers 208 with index card files 208.

The central server 202 includes a router 210 that directs packets comprising search requests and update transactions to an appropriate set of servers 214, 302 and 222. The web servers 214 receive and preprocess index queries and receive and process index card 206 generation or modification requests. The central server 202 further includes a master index server 218 containing a master copy of the entire central search index or catalog. A number of update servers 222 each receive updates from each host 208.

The central search engine 202 further includes an index card database server 226 and index card check server 228. The index card database server 226 stores an index card database as a list of index card files and their associated data fields for each web site. The web servers 214 may request records from or add records to this index card file database depending on the actions taken by web site administrators while maintaining their index card entries. The index card check server 228 periodically checks for valid new index card files as defined within the index card database server for web sites that are not being processed by a local agent program, as will be described in more detail below. If the defined index card in the index card database server 226 is not found by the index card check server 228, a notification is sent to the administrator of the site where the index card was supposed to be found.

Index card information may be automatically sent by each host to the central system by use of an agent program 204 on the host. Alternatively, instead of using an agent program on each host to send index card information to the central system, index cards may be retrieved directly by external central system programs, such as web crawlers, and the contents used to create categorized sets of web pages. This approach requires that the web server be capable of retrieving a list of the available index cards, or that the cards have predetermined (standardized) names. Once index cards have been retrieved by such systems, the content of the index card may be used to calculate rating values.

When an index card file is requested for a site which is not served by an agent 204, a message is sent to the Internet Service Provider ("ISP") or system administrator for the site hosting the web site, indicating that users of the system are requesting index cards. This server also periodically checks the validity of existing index cards on all sites and notifies the web site administrator if an index card file is missing. If an index card is missing and remains missing for a given number of check cycles, the index card check server 228 sends a request to the index card database server 226 to delete the entry for the index card. The index card check server 228 detects any changes in index card files, such as additions or removals, and converts these changes to transaction batches that are forwarded to a queue manager which, in turn, applies these changes to update the central index on the master index server 218, as will be described in more detail below. The index card check server 328 periodically verifies the status of all index cards at sites that are not being indexed by an agent 204.

The components of the central server 202 and their general operation have been described, and now the operation of the agent 204 and index card 206 will be described in more detail. Additional details about the agent technology is disclosed in U.S. patent application Ser. No. 09/575,971 which is incorporated by reference.

The agent 204 and index card 206 may both be present at a remote server 208. An index card 206 and agent can function independently of each other, as will be discussed in more detail below. The agent 204 is a small local program which executes at the remote server 208 and generates an incremental search engine update for all of the participating web sites on the web host 208. These index updates are transmitted by the agent 204 to the central server 202, where they are queued for addition to the central index.

The agent 204 runs on a system, such as a web host server, at the site of an organization, and processes content (objects) for all web sites available via mass storage from that system. The agent 204 processes all web sites located within the mass storage area to which it has access, unless configured to exclude some portion of a site or sites. The agent 204 uses the local web server configuration (object catalog or file system information) data to determine the root directory path (or other location information for the particular file system) for all web site file structures available.

While indexing the web sites at the remote server 208, the agent 204 recognizes index cards 206 stored at web sites on the server and provides index updates based on the contents of the index card files found. Once the agent 204 has indexed the web sites at the remote server 208, the agent transmits a transaction list to the central server 202, and this transaction list is stored on one of the update servers 222. The transaction list is referred to as a batch, and each batch contains a series of deletion and addition transactions formatted as commands.

The index card 206 is a small file that may contain conceptual and other non-mark-up language information which would be useful to improve the indexing of sites or parts of a single site on the remote server 208. An index card 206 may contain any information pertinent to the web site, including but not limited to keywords, phrases, categorizations of content, purpose of the site, and other information not generally stored in a web page. The index card 206 is generated manually by individual web site administrators. The administrator fills out a form at the central server 202, and receives an email containing the index card 206 or downloads the index card file after submitting the form contents. Upon receiving the index card 206, the administrator stores it within the file structure of the web site on the remote server 208. There may be multiple index cards 206 at the same web site, each describing specific portions of the site. Each index card 206 may refer to a single web page or a group of web pages stored within a specific subdirectory at the web site. All information stored in each index card 206 is applied to the pages referenced in the index card.

The central server 202 also allows remote users to generate and download index cards 206 to their remote site, and also verifies the validity of index cards 206 on web sites not serviced by an agent 204, as will now be explained in more detail. The web servers 214 receive and process index card 204 generation or modification requests from user browsers. Once the index card 204 has been generated or modified, the index card is transferred to the index card database server 226, which stores all existing index cards. The index card check server 228 periodically checks for new index cards 206 stored on the index card database server 226 for web sites that are not served by an agent 204. When an index card 206 is requested for a web site which is not served by an agent 204, the index card check server 228 sends a message to the system administrator or Internet service provider for the server hosting a web site telling them that site administrators on their server are requesting index cards 206. The index card check server 228 also periodically verifies the validity of existing index cards 206 on all sites not serviced by an agent 204. If an index card 206 is missing for a predetermined number of verification cycles, the index card check server 228 instructs the index card database server 226 to delete the entry for that index card. The index card check server 228 also converts any modifications, additions, or deletions to index cards 206 to transaction batches, and forwards these transaction batches to a queue manager 302. The queue manager 302 receives index card update transaction batches from the index card check server 228 and also receives agent update transaction batches from the agent update server 222, as will be described in more detail below.

Figure 2:
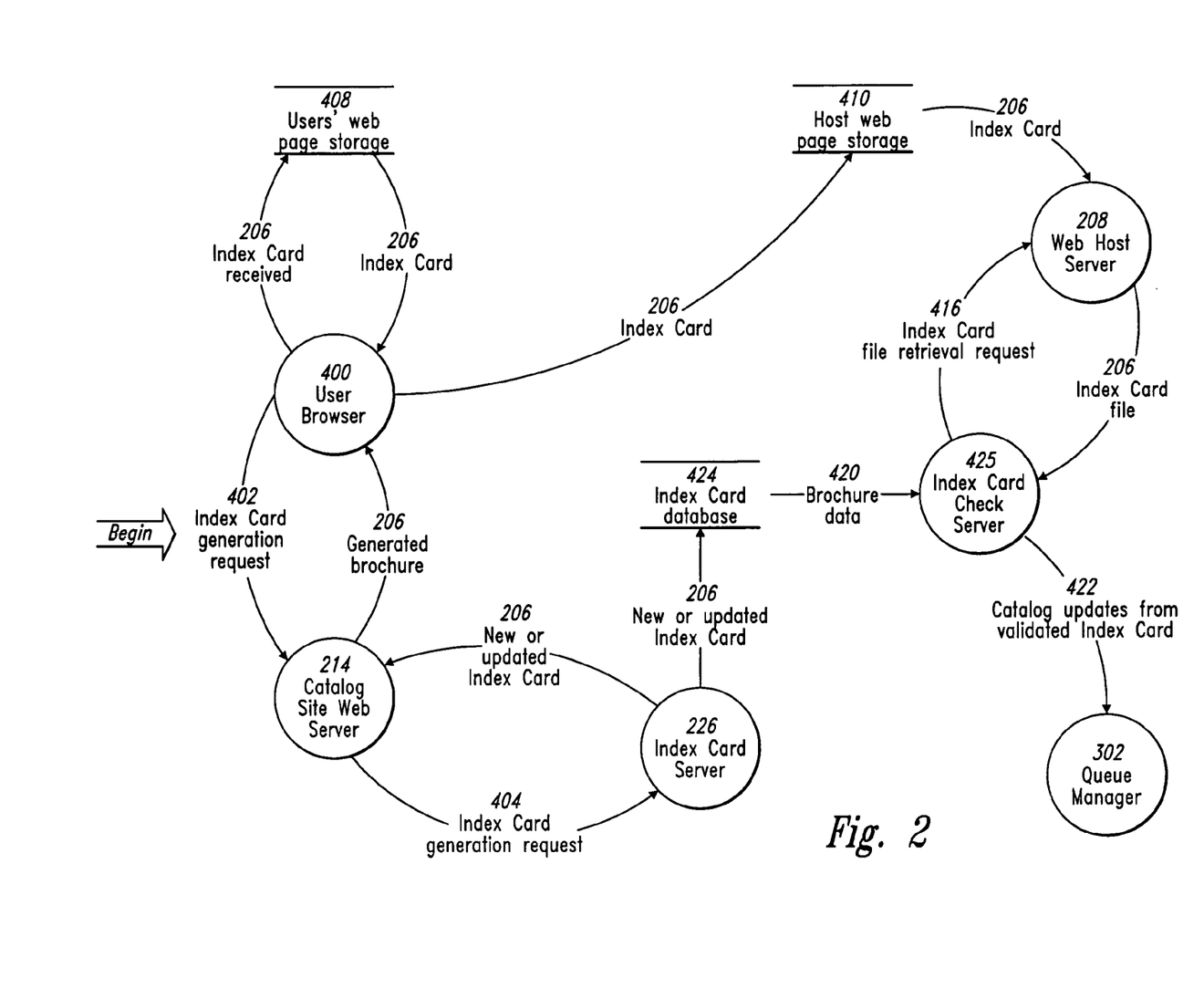
FIG. 2 is a bubble chart illustrating the generation and processing of a brochure file in the indexing system of FIG. 1.

FIG. 2 is a bubble chart illustrating the generation and processing of an index card 206 in the indexing system of FIG. 1. As previously mentioned, the purpose of the index card 206 is to allow the web host 208 and the web site to provide specific non-HTML information to help the central server 202 index the site and to provide more relevance to query results. The index card 206 can be created in two ways. First, as part of the installation program for the agent 204, the administrator of the remote server 208 completes a form that is converted to an encoded index card file 206, and then copied into the web directory on the remote server 208. This method of generating the index card 206 will be discussed in more detail below. The second method of generating the index card 206 utilizes an index card creator interface on the web servers 214 at the central server 202. This method will now be described in more detail with reference to FIG. 2.

To create an index card 206 using the index card creator interface, a user's browser 400 applies an index card generation request 402 to the associated central site web server 214. In response to the request 404, the index card creator interface generates a form which the user completes, and then sends an index card request 406 to the index card server 226, which generates an encoded index card file that is then sent to the central site web server 214. The central site web server 214 then sends the encoded index card file to the user's browser 400. The encoded index card file 206 is then stored in local storage 408. Subsequent to receiving the encoded index card file 206, the user sends the encoded index card file 206 via the user's web browser 400 to the web host site storage 410 (e.g., the web site host computer).

The index card server 226 stores the index card data 407 in an index card database 424 on the central server 202 once it has been generated as a result of an index card generation request 404. To verify proper storage of encoded index card files 206, the index card check server 425 retrieves index card data 420 from the index card database 424 and sends a request 416 to the web host server 404 to retrieve the encoded index card file 206 from the web host site storage 410. Upon successful retrieval of the index card file 206, the index card check server generates and transmits object references 422 created as a function of the index card data 420 to the queue manager 302. The queue manager 302 thereafter updates the central index to include the generated object references.

The directory structure of the host and web site are used to determine the relevance of the information in the index card. Information in an index card located in the root directory will apply to all sub-directories unless superceded by another index card. Information in a directory index card will apply to all subdirectories unless superceded by information in a subdirectory index card. Where an index card is placed determines the content to which the information applies. A web site owner can have as many index cards as there are pages or directories in his site. A site owner can request that their site be excluded from the central index by checking the EXCLUDE box next to the URL and copying the index cards into the directory to be excluded.

An example of a host index card is shown in Table 1:

TABLE 1

Host Index Card Records

Company Information:

1. IP number
2. Domain Name Server
3. Type of Domain Name Server
   HOST - Name________
   Company - Name________
   Individual - Name________
4. HOST name
5. Company Name if different
6. Contact Name
7. Address
8. Phone
9. Fax
10. Technical Contact name:
11. Technical Contact's direct phone number
12. Technical Contact's email address
13. Would you like the Technical Contact to receive email notification that of every successful site index update.
14. Business Contact name:
15. Business Contact's direct phone number
16. Business Contact's email address
17. Site Languages
18. Site Rating
19. URL/Sites to be indexed
20. URL/Sites to be excluded
   General Information: (optional)

1. Area served
2. Number of email boxes hosted________
3. Number of Domain Names hosted________
4. Number of web sites hosted.________

The host uses the configuration section of the agent program to create site index cards. The agent program can create site index cards for an entire IP address or for any subsection of the site.

In addition to the host index card, a web site owner may also place a site index card on his web site. The purpose of the site index card is to allow the web site owner to provide specific conceptual or non-html information, which will help in indexing the site. A sample site index card is shown below in Table 2.

TABLE 2

Site Index Card Records

Site Information:

1. URL for the Site directory for which this information applies
2. Top URL for this Site
3. INCLUDE or EXCLUDE URL
4. Language
5. Site Name________ (RealName)
6. Site Description________ (limited to 25 words)
7. Name of the site Host________
8. Contact Name
9. Address
10. Phone
11. Fax
12. Technical Contact name:
13. Technical Contacts' direct phone number TABLE 2-continued Site Index Card Records Site Information:

14. Technical Contacts' email address
15. Would you like the Technical Contact to receive email notification of every successful site index update.
16. Business Contact name:
17. Business Contacts' Direct phone number
18. Business Contact's email address
19. Type of site
20. Company - Name________
21. Organization Name________
22. Individual - Name________
23. Category
   General
   Specific Category
   Special interest
24. Related categories 1, 2, 3, 4, 5, 6, 7, 8, 9 & 10
25. Demographics Site's intended audience
   Age
   Sex
   etc.
26. Location of Site's intended audience:
   World
   Country
   State or Province
   City
   District
27. Key words (repeated words will not be indexed)
28. Key Phrases (repeated phrases will not be indexed)
29. Related Site's
30. Comments
31. Type of products for sale________
32. Location of products database________
33. Type of database________ SQL or ? or ?
34. Rating
35. Rating Descriptors
36. Others to be added.

The web site owner can create a different site index card for each page or directory on the site. For example, if the web site includes pages in different languages, the web site owner should create a site index card for each language with keywords and categories that match the language. Once the web site owner has filled in the index card form, they will click a button on a web page from the web server at the central server, and a web server creates an encoded html file that is then sent or downloaded to the site owner's computer. Each encoded index card file could be given a particular name, such as index card-domainname-com-directory-directory-directory.html, and the site owner is instructed to copy the encoded file into the specified web directory on the site.

At anytime, the web site owner can visit the central server site, update their index card, and download a new encoded index card. When updating an existing index card, the current index card information for the URL entered is displayed to reduce input time. Any site index card will supercede the host index card information, and information contained in the site index card will be assumed to be more current and accurate and will be used by the agent for indexing purposes. A site index card that is farther down in the directory tree from the root directory will supercede a site index card that is above it in the directory tree. A site owner can request that their web site be excluded from the index by checking the EXCLUDE box next to the URL and copying the index cards into the directory to be excluded.

If the host or web site URL is not currently being indexed, the web server performs the following operations. First, an automatic email is sent to contacts at the host to encourage the host to install the agent. An automatic email is also sent to a contact person for the web site with a "Thank You" and a request that they ask their host to install the agent. In addition, a retrieval order is generated for the central server to retrieve the index card file from the web site in one hour. If the retrieval order is unsuccessful, it will be repeated 2, 4, 8, 24 and 48 hours later, until successful. If still unsuccessful after 48 hours, the retrieval order is canceled. By verifying the presence of the site index card in the specified location, unauthorized information about a site may not be created by a third party in an attempt to have their site indexed along with a more popular site. This is a common problem with existing search engines where a third party copies the keywords from a meta tag in a popular site. The bogus site with copied keywords is then submitted to a search engine for indexing, and when search queries are applied to the search engine that produce the popular site the bogus site is also produced. This may not be done with the site index card because the index card is not an html page available to outside persons and because it is encrypted so even if the file is obtained the information contained therein is not accessible.

Index Card Verification and Indexing by the Agent

Software to create index cards and agent programs is distributed free to software publishers for inclusion in their web authoring software and to web server manufactures, publishers and OEMs for pre-loading on or inclusion with their products.

As mentioned above, the agent 204 is a software program that a web host downloads from the web servers 214 and installs on the host's server. To install the agent 204, the host runs an agent installation program, which collects information about the web site host and about the site itself, and also creates the web site host's index card 206 of non-HTML information. As part of the installation, the site host schedules a preferred time of day for the agent 204 to automatically index the web site and transfer index updates to the central server 202.

Although the agent 204 automatically indexes the sites on the host at scheduled times, the host can, at anytime, initiate an indexing update by opening the agent 204 and manually initiating an index update.

The agent 204 updates the index of the local site. First, the agent 204 determines whether the last index update was completed and transmitted successfully. If not, the agent 204 renames the Old-Site-Index file to Site-Index and the Old-Site-File-List to Site-File-List. The agent 204 then calculates a digital signature for the Site-Index file and a signature for the Site-File-List file and compares each to the digital signatures created at the end of the last successful update for Site-Index and Site-File-List files. If the digital signatures match, the agent 204 sends them to the central server 202 for comparison and waits for confirmation.

If the central server 202 does not confirm the match of the digital signatures (i.e., the signatures for the Site-Index and Site-File-List files on the central server 202 do not match those on the remote site), the agent 204 deletes the Site-Index and Site-File-List files, and notifies the central server 202 to delete all site records. Next, if the agent 204 was updated and Fields were added or deleted from the Site Index file, then the agent updates the Site-Index file to include the updates. The agent 204 then determines if the Site-File-Lists file exists, and renames the Site-File-List file to Old-File-List and create a text file named Site-File-List. If no Site-File-List exists but Old-File list exists, the agent 204 copies the Old-File-List file to Site-File List. If no Site-File-List and no Old-File-List files exist, the agent 204 creates a text file named Site-File-List. The agent 204 then calculates a digital signature hash for each file on the site and the host index card file and records the file name including full path and digital signature hash of all files.

If the central server 202 verifies that the digital signature hash of the Site-Index file and the digital signature hash for the Site-File-List file match, the agent 204 verifies the index card files. More specifically, the agent 204 determines if the file index-card.html file name does not match the directory in which it is located. If the file index-card.html is not in the expected directory, the agent 204 sends a warning email to the site contact listed in the index card and then renames index card.html to WrongDirectoryindex-card.html.

If the agent 204 determines that all index-card.html files match the directory in which they are located, the agent 204 deletes a file named Exclude-File-List, creates a text file named Exclude-File-List, checks index cards for EXCLUDE sites flags, and adds file names of files to be excluded from the index to the Exclude-File-List file. The agent 204 then creates a Deleted-File-List file containing a list of files that no longer exist on the site in their original location. More specifically the agent 204 deletes the old Deleted-File-List file, creates a text file called Deleted-File-List, compares the Site-File-List file to Old-File-List file and records in the Deleted-File-List any files in the Old-File-List that are not in Site-File-List.

The agent 204 then creates a New-File-List file containing a list of files that where created or modified since the last update. Next, the agent 204 indexes the corresponding site and creates a new Site-Index file.

The agent 204 then creates a New-Records-Index file and a Deleted-Records-List file. The agent 204 next removes records of deleted or modified files from the Site index.

The agent 204 then runs an indexing program against all files in the New-File-List file and creates a record for each new key word, phrase, MP3, Video, Movie, Link and index card information and adds these to the Site-Index file. The agent 204 then copies each new record created to the New-Records-Index file. If new fields were added to the Site Index, the agent 204 runs the indexing program against all files for new field information and creates records in Field-Update-Index for all information found. The agent 204 then updates the Site-Index file from the Field-Update-Index file.

At this point, the Site-Index file has been updated, and the agent 204 calculates a digital signature for the Site-Index file. Finally, the agent 204 creates a Site-Map file for the sites serviced by the agent. Once the Site-Map file has been generated, the agent 204 sends New-Records-Index and Deleted-Records-List files to the central server 202.

The agent 204 generates a site index, which is a database. The database includes a number of tables, each table consisting of records (rows) and fields (columns). Each table in the database includes similar records to speed searches. All Tables may be sorted alphabetically and then by category. In one embodiment of the agent 204, the agent generates Tables 3–12 as shown below.

TABLE 3

Agent Created Keywords Table Fields

| | |
|---|---|
| 1. | i. Keyword |
| 2. | Category - General, Specific, Special Interest Categories |
| 3. | Related categories 1, 2, 3, 4, 5, 6, 7, 8, 9 & 10 |
| 4. | Host IP address, |
| 5. | Site URL, |
| 6. | Unique Record Identifier |
| 7. | Location of first occurrence of word |

TABLE 3-continued

Agent Created Keywords Table Fields

| | |
|---|---|
| 8. | URL for first occurrence of word |
| 9. | Number of occurrences of word |
| 10. | Does word appear in meta header |
| 11. | Does word appear in index card keywords |
| 12. | Does word appear in index card phrases |
| 13. | Demographics restrictions (Y or N) |
| 14. | Location restrictions (Y or N) |
| 15. | Date file containing Key Phrase was created |
| 16. | Link to Site index card |
| 17. | Link to Host index card |
| 18. | Link URL Link Table |
| 19. | Html tag information |
| 20. | XML tag information |
| 21. | Ranking |

TABLE 4

Agent Created Key Phrases Table Fields 1. ii. Key Phrase
2. Category - three letters representing General, Specific Special Interest, and Categories
3. Related Categories 1, 2, 3, 4, 5, 6, 7, 8, 9 & 10
4. Host IP address,
5. Site URL,
6. Unique Record Identifier
7. Location of first occurrence of Phrase
8. URL for first occurrence of Phrase
9. Number of occurrences of Phrase
10. Does Phrase appear in meta header
11. Does Phrase appear in index card phrases
12. Demographics restrictions (Y or N)
13. Location restrictions (Y or N)
14. Date file containing Key Phrase was created
15. Link to Site index card
16. Link to Host index card
17. Link URL Link Table
18. Html tag information
19. XML tag information
20. Ranking

TABLE 5

Agent Created Products Catalog

| | | |
|---|---|---|
| 1. iii. Type of product | | |
| 2. Category - three letters representing General, Specific, and Special Interest Categories | | |
| 3. Related Categories 1, 2, 3, 4, 5, 6, 7, 8, 9 & 10 | | |
| 4. Product description | | |
| 5. Site URL, | | |
| 6. Unique Record Identifier | | |
| 7. | iv. | Product Number |
| 8. | v. | Product price |
| 9. | vi. | Feature or option |
| 10. Feature or option | | |
| 11. Feature or option | | |
| 12. Link URL Link Table | | |

TABLE 6

Agent Created Articles & Documents Table 1. vii. Type of Articles or Documents
2. Category - three letters representing General, Specific, and Special Interest Categories
3. Related Categories 1, 2, 3, 4, 5, 6, 7, 8, 9 & 10
4. Subject of Articles or Documents
5. Site URL,
6. Unique Record Identifier TABLE 6-continued Agent Created Articles & Documents Table

| | | |
|---|---|---|
| 7. | viii. | Date |
| 8. | ix. | Author |
| 9. | x. | Source of Articles or Documents |
| 10. | | |
| 11. | | |
| 12. Link URL Link Table | | |

TABLE 7

Agent Created MP3 Table

| | | |
|---|---|---|
| 1. xi. Title of Song | | |
| 2. Category - three letters representing General, Specific, and Special Interest Categories | | |
| 3. Related Categories 1, 2, 3, 4, 5, 6, 7, 8, 9 & 10 | | |
| 4. Host IP address, | | |
| 5. Site URL, | | |
| 6. Unique Record Identifier | | |
| 7. | xii. | Name of Group |
| 8. | xiii. | Name of Artist |
| 9. | xiv. | Name of Artist |
| 10. Name of Artist | | |
| 11. Name of Album | | |
| 12. Name of Record label | | |
| 13. Name of producer | | |
| 14. Name of MP3 file | | |
| 15. Size of MP3 file | | |
| 16. Year produced | | |
| 17. Link to Site index card | | |
| 18. Link to Host index card | | |
| 19. Link URL Link Table | | |

TABLE 8

Agent Created Video Table 1. xv. Name of Video
2. Category - three letters representing General, Specific Special Interest Categories
3. Related Categories 1, 2, 3, 4, 5, 6, 7, 8, 9 & 10
4. Host IP address,
5. Site URL,
6. Unique Record Identifier
7. Artists name 1
8. Artists name 2
9. Artists name 3
10. Name of director
11. Year produced
12. Name of Studio
13. Name of producer
14. Size of file
15. Link to Site index card
16. Link to Host index card
17. Link URL Link Table

TABLE 9

Agent Created URL Link Table 1. xvi. URL link
2. Category - three letters representing General, Specific Special Interest Categories
3. Related Categories 1, 2, 3, 4, 5, 6, 7, 8, 9 & 10
4. Host IP address,
5. Site URL,
6. Unique Record Identifier
7. URL link to other links in the Link Table.
8. Other desired information
9.
10.
11.

TABLE 10

Agent Created Site Index Card Table

1. Site URL
2. Site Name ____________ (RealName)
3. Site Description (limited to 25 words)
4. Name of site Host ____________
5. Contact Name
6. Address
7. Phone
8. Fax
9. Contact person for technical related issues:
10. Contacts' direct phone number
11. Contacts' email address
12. Contact person for business related issues:
13. Contacts' Direct phone number
14. Contact's email address
15. Type of site
16. Company - Name ____________
17. Organization Name ____________
18. Individual - Name ____________
19. Category
20. General
21. Specific Category
22. Special interest
23. Related Categories 1, 2, 3, 4, 5, 6, 7, 8, 9 & 10
24. Demographics Site's intended audience
25. Age
26. Sex
27. Location of Site's intended audience:
28. World
29. Country
30. State or Province
31. City
32. District
33. Key words (repeated words will not be indexed)
34. Key Phrases (repeated phrases will not be indexed)
35. Related Site's
36. Comments
37. Others to be added.

TABLE 11

Agent Created Company Information from Host Index Card

1. IP number
2. Domain Name Server
3. Type of Domain Name Server
4. ISP - Name ____________
5. Company - Name ____________
6. Individual - Name ____________
7. ISP name
8. Company Name if different
9. Contact Name
10. Address
11. Phone
12. Fax
13. Contact person for technical related issues:
14. Contacts' direct phone number
15. Contacts' email address
16. Contact person for business related issues:
17. Contacts' Direct phone number
18. Contact's email address
19. General Information: (optional)
20. Area served
21. Number of email boxes hosted ____________ or N/A
22. Number of Domain Names hosted(?) ____________ or N/A
23. Number of web sites hosted. ____________ or N/A
24. Other Desired Information

TABLE 12

Agent Created Site Map

1. Site Map
2. IP number

Updating the Central Copy of Each Index Card

Figure 3:
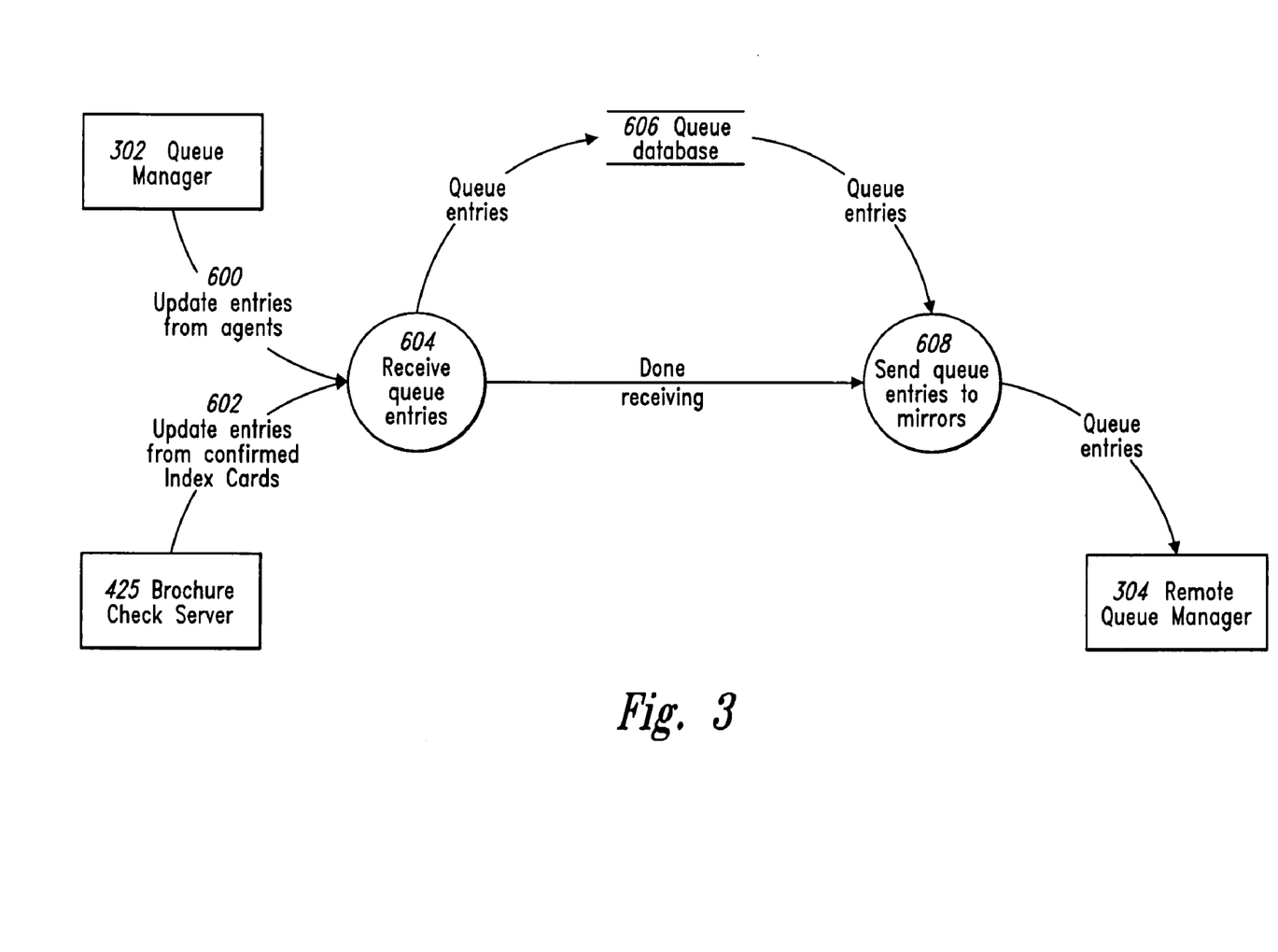
FIG. 3 is a bubble chart illustrating the process executed by the queue manager in queuing update entries and transferring these entries to the remote queue manager.

FIG. 3 is a bubble chart illustrating the process executed by the queue manager 302 of FIGS. 1 and 2 in queuing update entries and transferring these entries to the remote queue manager 304. The queue manager 302 receives update entries 600 from the agent update server 222 and update entries 602 from the index card server 228, and places these update entries in an update queue 604. The entries in the queue 604 are transferred to a queue database 606. Once the queue 604 is done receiving update entries 600, 602, which may be when the queue is full or at predetermined intervals, the queue manager 302 goes to step 608 and retrieves the queue entries from the queue database 606 and sends them to the remote queue manager 304. The update entries stored in the queue database 606 are thereafter processed by the update processing server 306 (see FIG. 1) to update the local master index on master index sever 218 (see FIG. 1). The queue manager 302 also receives a deletion request (not shown) from the update processing server 306 and deletes update entries stored in queue database 606 in response to this deletion request.

Figure 4:
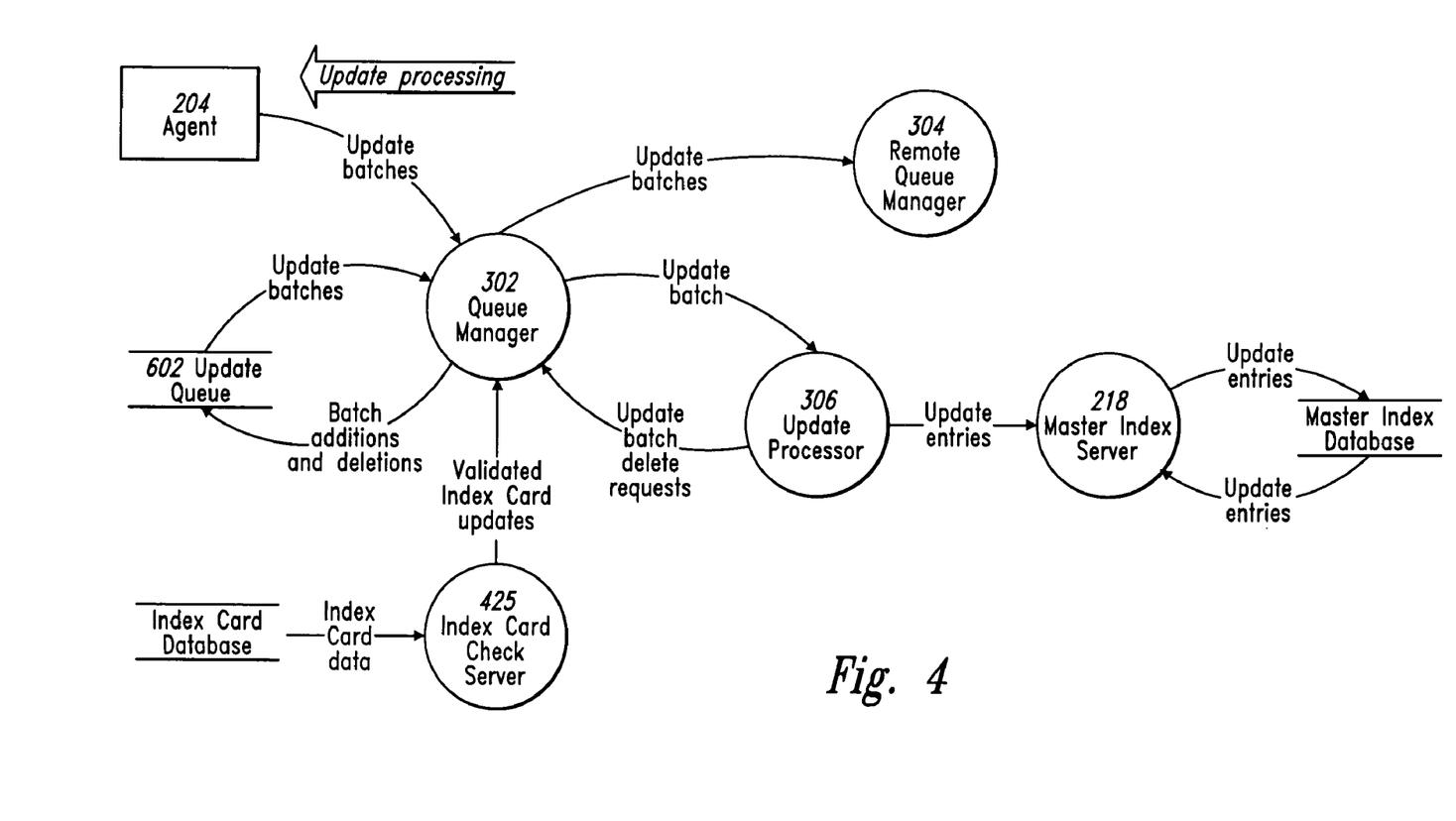
FIG. 4 is a bubble chart illustrating the overall data flow in the search engine of FIG. 1.

FIG. 4 is a bubble chart illustrating the overall data flow between the search engine 202, agent, and index card components of the active indexing system. Each aspect of the overall data flow has already been described in a corresponding section above, and thus FIG. 4 will now be described merely to provide a brief description of the data flow of the indexing system according to one embodiment of the present invention.

The queue manager 302 receives updates from each of the agents 204 and from the index card check server 228, which services sites without an agent 204 as previously described. The queue manager makes update and deletions to the queue database 602 corresponding to the received updates, and also provides a mirror copy of these updates to the remote queue manager 304. The update processing server 306 retrieves the update entries from the queue manager 302, and applies the updates to the master index servers 218. The server 218 updates the master index to include the applied updates, and the update processing server 306 then sends a deletion request to the queue manager 302 to delete the corresponding entries from the queue database 602.

Once the master index server 218 has updated the master index, the server updates the segmented index stored on the search index servers 216, 217 as previously described. Each of the search index servers 216, 217 updates its corresponding portion of the segmented index in response to the updates from the master index server 218. As previously mentioned, the entire segmented index stored on the index servers 216 is continuously available for processing search requests even during updating of the segmented index. The entire segmented index is available due to the redundant architecture of the servers 216, 217, as previously described.

Use of Index Cards to Limit Exposure of Objects

With the architecture of the indexing system, everything, including each field in a local database, is treated as an object. Instead of copying each object to a central location, an object reference is created at each local site and sent to a cataloging location or locations. The objects are not duplicated in a monolithic central database. One advantage to this architecture is that the decision of whether to expose the existence and classification of local objects becomes the responsibility and choice of the author, rather than a generic decision. In the system, the implementation of retention rules and the physical location of the objects remain with the author. The searchable central catalog merely references the distributed objects, eliminating the need to make full copies and therefore manage a large storage system.

Rating with Agents or Index Cards

The agent 204 may also generate ratings for objects stored on the associated sites so that users may filter their searches based upon the generated ratings. For example, in one embodiment, an owner of a web site provides a rating of his site, such as a "G," "R," or "X" rating. In addition, the web host, on which the agent 204 runs, also provides a rating that the host believes applies to the site. The agent 204 then parses the pages on the site and looks for adult content "trigger" words, such as "XXX" or "XXX-Rated." If the agent 204 finds enough occurrences of such trigger words, the agent "flags" the web site for review to determine the correct rating for the site. To rate the site, the agent 204 compares the words in the web pages to words in a list of ratings values.

The list of ratings values may be, for example, words that are generally found on adult web sites, such as profane and sexually explicit words. The list of ratings values may be generated by a human or may be automatically generated by the agent 204. To automatically generate the list, the agent 204 could, for example, parse known adult web sites. Such known adult web sites could be identified by determining those sites in the catalog that include the phrases "adult content" or "X-rated." Once these sites are identified, the agent parses the pages and determines frequently used words on such pages, and may also determine the frequency with which such words occur on these pages. The frequently used words and associated frequencies are then compiled to form the list of ratings values.

After flagging web sites for review, the review may be either through human review of the web site or through automated review performed by the agent 204. In automated review of flagged web sites, the agent 204 could, for example, determine the frequency of occurrence of words in the list of ratings values, and then set the rating of the web site as a function of the frequency. For example, if the frequency is greater than some threshold T1, the web site is rated "R," and if greater than a second threshold T2, where T2>T1, the site is rated "X".

One proposed system for rating web pages on the Internet is described in *A Best Practices Model* by Members of the Information Society Project at Yale Law School, J. M. Balkin, Beth Simone Noveck, Kermit Roosevelt (Jul. 15, 1999), which may be found at <<http://webserver.law.yale.edu/infosociety/>>. In this proposed system, three layers are implemented to provide for rating web pages. The first layer includes a basic vocabulary of, for example, thirty to sixty terms that are used in rating a web page by a first party, typically the site owner containing the web page. The second layer includes rating templates developed to reflect a particular ideology. Third parties, such as the NAACP or Christian Coalition, would develop such templates to reflect a particular value system. The templates would include terms in the basic vocabulary being categorized and scalar values assigned to each item to reflect the value system. Finally, in layer three, individuals could customize or modify a template to suit their individual values. For example, a template developed by the Christian Coalition could be further modified to include scalar values for web sites designated as racist by the NAACP.

The indexing system can utilize such a rating system to perform filtering of search results at the central server 202. For example, user's browsers can be registered with the central server 202, and part of this registration includes selection of a template and any desired modifications to the selected template. Thereafter, whenever the user's browser applies a search query to the central server 202, the browser registration is identified and the search results generated in response to the query are "filtered" according to the template and any template modifications associated with the registered browser.

The indexing system also may perform adult-content locking. In conventional search engines, adult-content web sites are automatically provided in response to applied search queries. The only way for a user to filter adult-content is through a filter on his browser. Thus, current search engines are "opt-in" in that the search engine does not preclude adult-content pages from being returned in response to applied search queries. Conversely, in one embodiment of the indexing system, the user is automatically opted out of receiving adult-content web pages in response to applied search queries. The user must reverse this default "opt-out" status and elect receive adult-content web pages in the system. This could be done, for example, by registering a browser with the system so that, when the registered browser is identified, adult-content web sites will be returned in response to applied search queries. Alternatively, a machine level lock using the computer or machine identification, such as the CPU or Windows identification number, could be utilized. In this approach, regardless of the browser being utilized on the computer, adult-content is either returned or not returned in response to applied search queries. This approach may be particularly desirable for parents who want to preclude their children from accessing adult-content, since a child cannot merely use a new browser on the same machine and thereby circumvent the filter the parent has on his or her browser.

Ranking with Index Cards or Agents

The indexing system may also perform ranking of web pages having references in the central index. First, the agent 204 may perform positional and contextual rankings for particular words in the web pages on a site. The positional rankings assign a ranking value to a word based upon, for example, the location of the word in the web page and the position of the word relative to other words in the page. The contextual ranking is determined using contextual information about the site contained in the index card 206. For example, if a word in a web page corresponds to a category as listed in the index card 206 (see Table 2), the word will be assigned a higher ranking.

In addition to rankings generated by the agent 204, the central server 202 also generates rankings for the central index. For example, the central server 202 may generate rankings based upon whether a page is a source or reference to the desired data. In such an analysis, the number of links inbound to the page being processed (and the content of these external pages) are used to generate a ranking value for the current page. Similarly, an analysis of the links outbound from the page are performed, determining the importance of the page as a "reference" to information as opposed to being a "source" containing information referenced by other pages. As a crude example, the number of inbound links to a page would determine it's ranking. Rankings may also be determined based upon user input such as the usage or popularity of a site as measured by how often the site is linked as the source site in other sites, or through positive comments entered by users about the context or ranking of a site.

All the methods of ranking just described are known as static rankings, meaning that the ranking is determined before a particular search query is applied. In addition to static rankings at the central server 202, the central server may also perform dynamic ranking of search results. Dynamic rankings are a function of the applied search query, are not predetermined, and are not independent of the query. For example, if the applied search query is "red barn," the word "barn" is probably more important than "red" so search results including the word "barn" will have their ranking increased relative to those containing only the word "red."

Furthermore, ratings could be applied to search queries to create another type of dynamic ranking at the central server 202. For example, a rating could be used as part of a query, to restrict searches to those sites or documents which have a certain minimum or maximum rating. Once the result set of matching sites or documents is retrieved, the resulting list could be ranked in order of rating value. For example, one might search for all pages with a "PG" rating (as determined by the Motion Picture Association Of America) or lower (where "G" would be the lowest). Pages could then be ranked where "G" rated pages are ranked higher than pages which have more mature content.

Finally, a user may select which ones of the previous methods of rankings should be applied in ranking search results generated in response to his applied query. For example, a user could specify that his search results are to be ranked only on the basis of popularity, or only on the basis of positional and contextual rankings and the applied search query. Another example for the use of dynamic ranking is, using the information in the index card 206, the search results can be ranked dynamically based on the geographic distance from the searcher.

Index cards may be read by external systems as opposed to local programs such as an agent. The information retrieved from the index cards may then be used to perform ranking analysis on the pages related to that index card. For example, the physical location data (address or geographical coordinates) might be used by a system to rank sites based on the proximity of the site owner to a major population center. In the current industry environment, there are automated search and collating systems which regularly interrogate or visit websites and extract relevant information from those sites. The resulting information is then analyzed and presented in some form to subscribers of a service or members of a "portal" site. Similar methods could be used to regularly retrieve index cards from known web sites and then perform analysis on the information contained in those index cards.

Ranking with Relationship Values Calculated by Agents

According to another embodiment of the agent 204, the agent calculates a value representing the distance in text between objects and thereby determines which objects at a site are most likely to relate to each other. At the catalog site, these relationship values are combined with the relationship values from other sites to create a relationship value table. This relationship value table represents the likelihood of an object occurring together with another object. This table may be used to refine searches and create relevance ranking.

Clustering Search Results with Index Cards

The index cards allow documents on a web site to be automatically categorized based on classifications entered by the web site administrator. Such classifications can apply to the entire site, certain subsets of the site content, or individual documents stored on the site. This categorization information is transmitted by the agent software to the central index or retrieved by the central server in an embodiment without agents.

Since the classification information is known for all pages, the results of a search performed at the central index can be clustered by category. It is not even necessary to display the list of matching documents—the user of the system can simply view the number of documents found within each category. The results display can further be refined by structuring the categories in a hierarchical fashion, where selection of a category containing matches would cause a display of all subcategories containing matches as well as any matches found within the selected category itself.

The primary advantage of such clustering is to provide the user of the system context upon which to base a decision as to the relevance of the set of documents found. For example, a query for "Ford" might produce matching documents within the topics of "Retailing", "News" and "Reference Material." If the searcher was interested in finding a Ford Motor Company retail dealership, matches under "Retailing" would be of more interest than all others. By providing the context indicating in what category the search results fall, the searcher is able to discern what search results are relevant without the use of ranking algorithms.

Example Part I:

The search for "Ford" found the following:

| | |
|---|---|
| Retailing: | 700 matches in 15 subcategories |
| News: | 3000 matches in 8 subcategories |
| Reference Material: | 36 matches in 2 subcategories |

Example Part II

| | |
|---|---|
| Retailing (700 matches) | |
| Ford Motor Company Retail Dealers: | 550 matches in 51 subcategories |
| Repair Facilities - Ford Motor Co. | 150 matches in 12 subcategories |
| Products: | |

In the example part I above, a search has been performed by the user for the word "Ford." A resulting display containing information about matching pages has been generated and is now displayed on the user's screen within a standard web browser. Each heading listed is a hyperlink which, when selected, causes the list of matching pages and subcategories to be displayed as is shown in the example part II where the user has selected the hyperlink titled "Retailing" in part I. In both parts, the categorizing of results based on data supplied by index cards is shown.

This example shows that categorization can done at more than one level in a hierarchy or ontology. Thus, a page which was categorized as "Retailing/Automobiles/Ford Motor Company/Dealers/USA/California/Los Angeles Area" would actually apply towards the match count at several levels of a hierarchy.

Implementation with Java

A Java-based implementation of the software elements of the indexing system is now described according to one embodiment of the present invention.

First, most users, with the exception of individuals using the search engine to find information on the Internet, will need to be authenticated, as illustrated in FIG. 12. The operations that need to be supported to authenticate users include those shown in Table 13.

TABLE 13

| Case | Description |
| --- | --- |
| Register | This requires the entry of sufficient information for central records. Index card users can register themselves and have restricted access only to their own records. |
| Logon | Allows the user to access the part of their system they have permission to access. |
| Logoff | Ensures the user is no longer active on this system. |

A web site owner may be a content developer that owns a web site and develops content for that web site. Such a person may be hosting their own site but is often simply deploying content on another entity's machine. In this role, the owner does not administer the hardware/software and manages only site content. The operations that need to be supported include those shown below in Table 14.

TABLE 14

| Case | Description |
| --- | --- |
| List Existing Index cards | Provides a selection list of existing index cards previously created by this user. |
| Create Index card | Create a new index card, name it and fill out a form to describe site content. |
| Edit Index card | Created index card can be edited to keep information current or to correct errors. |
| Duplicate Index card | An existing index card can be used as a starting point for a new index card. It must be given a new name when duplication occurs. |
| Delete Index card | An outdated index card can be removed from the database. |
| Download Index card | A index card must be downloaded to the user's system in the format required for deployment. |
| Install Index card | A index card must be installed on the web site after it has been downloaded. |
| Configure Notification | Notification is sent to the user when the agent updates the index or when index cards are scanned by the update manager. The user can choose the level of notification they receive. |

The role of the web searcher is the end user of the system, which operates for free on the Internet, or any other future global communications network, since revenue is brought in through other entities. A web searcher expects to use the system to find things and navigate through their findings. Operations that need to be supported for web searches include those shown in Table 15.

TABLE 15

| Case | Description |
| --- | --- |
| Select Categories | High-level categories are presented for user selection. |
| Execute Search | This means entering one or more keywords and executing the actual search. |
| Refine Search | After a preliminary search, additional options are made available to narrow the search to more targeted information. |
| Select Ranking Algorithm | Once the number of hits in the result set has been reported, the user can choose the algorithm to rank results by. |
| Display Results | After selecting a ranking algorithm, the user can display results. After seeing the first result page, the user can choose to continue to the next page or go back at will. |

TABLE 15-continued

| Case | Description |
| --- | --- |
| Request Site Reclassification | If one of the resulting page hits from a search appears questionable to a user, they may sent a request that we reclassify the site. This is especially important with adult content mistakenly found in non-adult searches. |

Figure 5:
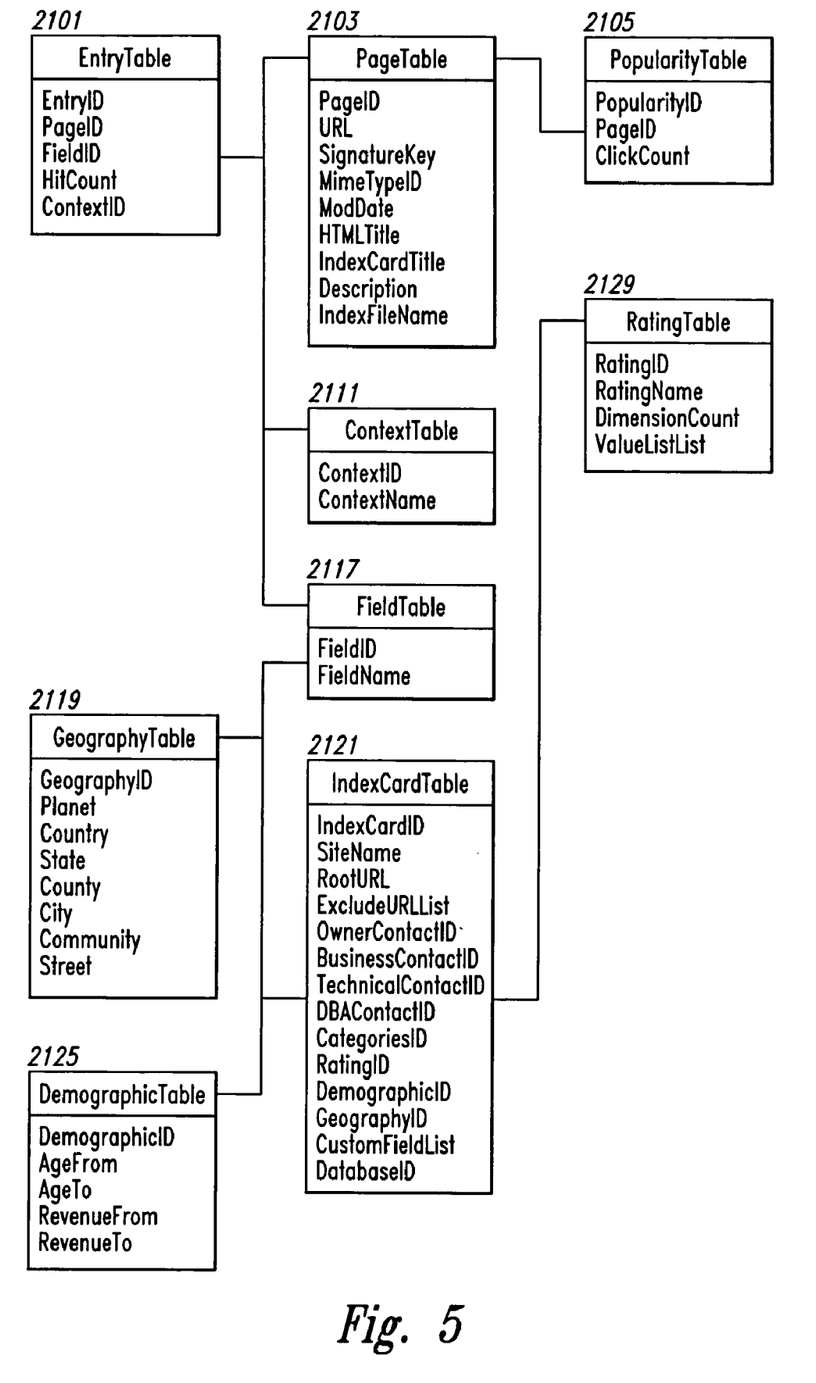
FIG. 5 illustrates components of the indexing system of FIG. 1 for a Java-based implementation.

Persistent information is stored in a database or in temporary files on the system. The database tables relate to each other as shown in FIG. 5. The following tables specify the data dictionary for tables illustrated in FIG. 5 that relate to index cards, ranking, and rating.

The ContextTable 2111 of FIG. 5 defines possible contexts for indexing. These represent a short list such as HEAD, BODY and META for HTML pages. The ContextTable does not reference any other tables.

The PopularityTable 2105 of FIG. 5 stores statistical information about the popularity of given pages, based on how often the page was selected after a search. This information is used when the user chooses popularity-based ranking at result display time. The popularity table is shown in more detail in Table 16 below. The PopularityTable 2105 references the PageTable 2103.

TABLE 16

| Field | Type | Key | Description |
| --- | --- | --- | --- |
| PopularityID | LONG | Primary | This is the primary key for the PopularityTable. It is an auto-increment integer value that is unique across the system. |
| PageID | LONG | Foreign | This is a foreign key pointing to the PageTable's primary key. |
| ClickCount | LONG | None | The number of times we have recorded users clicking through this page on the search engine site. |

The IndexCardTable 2121 of FIG. 5 stores information related to electronic index cards. The IndexCardTable references the FieldTable 2117, the ContactTable 2123, the GeographyTable 2119, the DemographicTable 2125, the RatingTable 2129, and the DatabaseTable 2127. The fields of the IndexCardTable are shown in Table 17 below:

TABLE 17

| Field | Type | Key | Description |
| --- | --- | --- | --- |
| IndexCardID | LONG | Primary | This is the primary key for the IndexCardTable. It is an auto-increment integer value that is unique across the system. |
| SiteName | TEXT (64) | None | Name of site to be indexed. |
| RootURL | VARCHAR | None | URL for the root of the site structure to be indexed with this index card. |
| ExcludeURLList | VARCHAR | None | List of URL within this structure to be excluded. |
| OwnerContactID | LONG | Foreign | This is a foreign key pointing to the ContactTable's primary key. |
| BusinessContactID | LONG | Foreign | This is a foreign key pointing to the ContactTable's primary key. |
| TechnicalContactID | LONG | Foreign | This is a foreign key pointing to the ContactTable's primary key. |

TABLE 17-continued

| Field | Type | Key | Description |
|---|---|---|---|
| DBAContactID | LONG | Foreign | This is a foreign key pointing to the ContactTable's primary key. |
| CategoriesID | LONG | Foreign | This is a foreign key pointing to the CategoriesTable's primary key. |
| RatingID | LONG | Foreign | This is a foreign key pointing to the RatingTable's primary key. |
| DemographicID | LONG | Foreign | This is a foreign key pointing to the DemographicTable's primary key. |
| GeographyID | LONG | Foreign | This is a foreign key pointing to the GeographyTable's primary key. |
| CustomFieldList | VARCHAR | None | List of user-defined fields to be indexed by the agent. |
| DatabaseID | LONG | Foreign | This is a foreign key pointing to the DatabaseTable's primary key, |

The GeographyTable 2119 of FIG. 5 is shown in more detail in Table 18 below. This table stores information related to the geographical target market for a given index card. The GeographyTable does not reference any other tables.

TABLE 18

| Field | Type | Key | Description |
|---|---|---|---|
| GeographyID | LONG | Primary | This is the primary key for the GeographyTable. It is an auto-increment integer value that is unique across the system. |
| TargetCountry | TEXT (64) | None | Target market country. |
| TargetState | TEXT (64) | None | Target market state. |
| TargetCounty | TEXT (64) | None | Target market county. |
| TargetCity | TEXT (64) | None | Target market city. |
| TargetCommunity | TEXT (64) | None | Target market community name. |
| TargetStreet | TEXT (64) | None | Target market street. |

The Demographic Table 2125 of FIG. 5 is shown in more detail in Table 19 below. This table stores information related to the demographic target market for a given index card. The Demographic Table does not reference any other tables.

TABLE 19

| Field | Type | Key | Description |
|---|---|---|---|
| DemographicID | LONG | Primary | This is the primary key for the DemographicTable. It is an auto-increment integer value that is unique across the system. |
| AgeFrom | INT | None | Demographics minimum age. |
| AgeTo | INT | None | Demographics maximum age. |
| RevenueFrom | MONEY | None | Demographics minimum revenue. |
| RevenueTo | MONEY | None | Demographics maximum revenue. |

The Rating Table 2129 of FIG. 5 is shown in more detail in Table 20 below. The table stores information related to ratings associated with a given index card. The RatingTable does not reference any other tables.

TABLE 20

| Field | Type | Key | Description |
|---|---|---|---|
| RatingID | LONG | Primary | This is the primary key for the RatingTable. It is an auto-increment integer value that is unique across the system. |
| RatingName | TEXT (64) | None | Name of this rating system. |
| DimensionCount | INT | | Number of dimensions in the rating system. |
| ValueListList | VARCHAR | | List of values for each dimension. |

The packages in the system are either low-level utility packages, components, applications and services or user interface elements. Support packages, like the database, catalog, html and xml packages, provide a foundation for other program functionality. A few of the services, the message and index services, for example, are grouped as shared because several of their classes provide functional capabilities between both the agent and server elements. The index card package is also shared. The application and service level packages construct the agent and the server-side Jini services. Taken together, the classes in these packages function together as a complete, integrated, distributable system.

The shared index card package is shown in more detail in the following

TABLE 21

| Class | Description |
|---|---|
| IndexCardService | This is an implementation of a service that provides access to index cards on the server. It is used by the servlets to provide index card management services and by the update manager to verify content. |
| Index cardDocument | An index card document is an XML representation of an index card. |
| DocumentIndexCard | A document index card applies to html documents. |
| DatabaseIndexCard | A database index card applies to databases on the target machine. |

The shared rating package contains classes related to rating systems, as shown in the following Table 22.

TABLE 22

| Class | Description |
|---|---|
| Rating | Interface defining methods required to operate as a rating class. |
| AbstractRating | Abstract class which implements common behavior and internal methods useful in implementing rating classes. |
| MovieRating | Movie rating class offers two option dimensions (G, PG, R, X . . . and Sex, Violence . . . ). The set of options is retrieved using the indexed getOptionList method. |
| InternetRating | This class is a place-holder for future rating systems. |

Each of the previously recited methods is performed by a program contained on a computer-readable medium, such as a CDROM. The program may also be contained in a computer-readable data transmission medium that may be transferred over a network, such as the Internet. The data transmission medium may, for example, be a carrier signal that has been modulated to contain information corresponding to the program.

It is to be understood that even though various embodiments and advantages of the present invention have been set forth in the foregoing description, the above disclosure is illustrative only, and changes may be made in detail, and yet remain within the broad principles of the invention. Therefore, the present invention is to be limited only by the appended claims.

We claim:

1. A method of constructing a catalog of rankings from objects stored within a network, the network including a plurality of interconnected computers with one computer storing the catalog and being designated a cataloging site and at least two other computers storing a plurality of objects and being designated source sites, the method comprising:
   a) receiving inputs from users of each of the two or more source sites mapping one or more of the plurality of objects to one or more user defined descriptors associated with a category of descriptors;
   b) storing the inputs in an index file
   c) running on each source site a program which assembles data relating to objects stored on the source site;
   d) ranking at least some of the assembled data as a function of a set of ranking rules and the index file, thereby assigning rankings to the assembled data;
   e) transmitting the rankings from each source site to the cataloging site; and
   f) aggregating the rankings at the cataloging site to generate a catalog of rankings,
      wherein at least one of the rankings relates to a set of objects on the source site and
      wherein an agent calculates a relationship value representing a distance in text between objects and, at the cataloging site, these relationship values are combined with relationship values from other sites to create a relationship value table representing the likelihood of an object being similar to another object.

2. The method of claim 1 wherein at least one of the rankings has a value that is function of one of the one or more user defined descriptors associated with one or more objects with which the ranking is associated.

3. The method of claim 1 wherein some of the assembled data comprises data from the content of objects on the source site.

4. The method of claim 1 wherein some of the assembled data comprises meta data relating to objects on the source site.

5. The method of claim 1 wherein each transmitted ranking is accompanied by a command to the cataloging site instructing the cataloging site what to do with the ranking.

6. The method of claim 1 wherein the program further assembles object references for objects on the source site, and these object references are transmitted to the cataloging site and aggregated into the catalog on the cataloging site.

7. The method of claim 1 wherein the program further transmits to the cataloging site some of the assembled data which is aggregated into the catalog on the cataloging site.

8. A method of rating objects stored at a site on a network and constructing a catalog of ratings, the network including a plurality of interconnected computers with access to the objects, the method comprising:
   a) receiving inputs from a host of the site mapping one or more of the objects to one or more host defined descriptors associated with a category of descriptors;
   b) storing the inputs in an index file;
   c) running on the site a program which processes objects stored on the site, thereby assembling values found in at least one of the objects for comparison to a list of rating values;
   d) generating a rating for each object by relating the values found in the object to the list of rating values;
   e) aggregating the ratings to generate the catalog of ratings;
   f) comparing the values found in the object to the host defined descriptors mapped to the objects in the index file; and
   g) generating a category indication for a result of a search based on the catalog of ratings.

9. The method of claim 8 wherein each of the rating values comprises a word.

10. The method of claim 8 wherein the rating values are supplied by a human.

11. The method of claim 8 wherein the rating values are supplied by a computer.

12. The method of claim 8 wherein generating a rating comprises generating a ratings flag when the values found in the object indicate a first rating for the object and at least one of the values from an owner of the site or a host of the site indicates a second rating for the object different than the first rating.

13. The method of claim 8 wherein aggregating ratings includes triggering a human review indicator for review by a human of objects having flags to determine the correct ratings for the objects.

14. The method of claim 8 wherein aggregating ratings includes triggering a computer review of objects having rating flags to determine the correct ratings for the objects.

15. The method of claim 8 wherein the step of processing objects comprises processing meta data for the objects.

16. The method of claim 8 wherein the list of ratings values is stored on the site.

17. The method of claim 8 wherein the list of ratings values is stored on a second site.

18. A computer program product residing on a computer-readable medium for performing a method of constructing a catalog of rankings from objects stored within a network, the network including a plurality of interconnected computers with one computer storing the catalog and being designated a cataloging site and at least two other computers storing a plurality of objects and being designated source sites, the computer program product performs the steps comprising:
   a) receiving inputs from a host of the site mapping one or more of the objects to one or more user defined descriptors associated with a category of descriptors;
   b) storing the inputs in an index file
   c) running on each source site a program which assembles data relating to objects stored on the source site;
   d) ranking at least some of the assembled data as a function of a set of ranking rules and the index file, thereby assigning rankings to the assembled data;
   e) transmitting the rankings from each source site to the cataloging site; and
   f) aggregating the rankings at the cataloging site to generate a catalog of rankings,
      wherein at least one of the rankings relates to a set of objects on the source site and
      wherein an agent calculates a relationship value representing a distance in text between objects and, at the cataloging site, these relationship values are combined with relationship values from other sites to create a relationship value table representing the likelihood of an object being similar to another object.

19. A product of claim 18, wherein some of the assembled data comprises data from the content of objects on the source site.

20. A product of claim 18, wherein some of the assembled data comprises meta data relating to objects on the source site.

21. A product of claim 18, wherein each transmitted ranking is accompanied by a command to the cataloging site instructing the cataloging site what to do with the ranking.

22. A product of claim 18, wherein the program further assembles object references for objects on the source site, and these object references are transmitted to the cataloging site and aggregated into the catalog on the cataloging site.

23. A product of claim 18, wherein the program further transmits to the cataloging site some of the assembled data which is aggregated into the catalog on the cataloging site.

24. A computer program product residing on a computer-readable medium for performing a method of rating objects stored at a site on a network and constructing a catalog of ratings, the network including a plurality of interconnected computers with access to the objects, the method comprising:
   a) receiving inputs from a host of the site mapping one or more of the objects to one or more user defined rating values;
   b) storing the inputs in an index file
   c) running on the site a program which processes objects stored on the site, thereby assembling values found in at least one of the objects for comparison to a list of rating values;
   d) generating a rating for each object by relating the values found in the object to a list of human input rating values supplied by an owner of the site and stored in a file associated with the site which file is read by said program;
   e) aggregating the ratings to generate the catalog of ratings; and
   f) comparing the values found in the object to the user defined rating values.

25. A product of claim 24, wherein each of the rating values comprises a word.

26. A product of claim 24, wherein the rating values are supplied by a human.

27. A product of claim 24, wherein the rating values are supplied by a computer.

28. A product of claim 24, wherein additional human input rating values are supplied by a host of the site and stored in said file.

29. A product of claim 24, wherein generating a rating comprises generating a ratings flag when the values found in the object indicate a first rating for the object at least one of the values from an owner of the site or a host of the site indicates a second rating for the object different than the first rating.

30. A product of claim 24, wherein aggregating ratings include triggering a human review indicator for review by a human of objects having flags to determine the correct ratings for the objects.

31. A product of claim 24, wherein aggregating ratings includes triggering a computer review of objects having rating flags to determine the correct ratings for the objects.

32. A product of claim 24, wherein the step of processing objects comprises processing meta data for the objects.

33. A product of claim 24, wherein the list of ratings values is stored on the site.

34. A product of claim 24, wherein the list of ratings values is stored on a second site.

\* \* \* \* \*